April 18, 1933.　　A. E. O. WENDORF　　1,904,109
ROUTER GAUGE AND GUIDE
Filed April 6, 1932
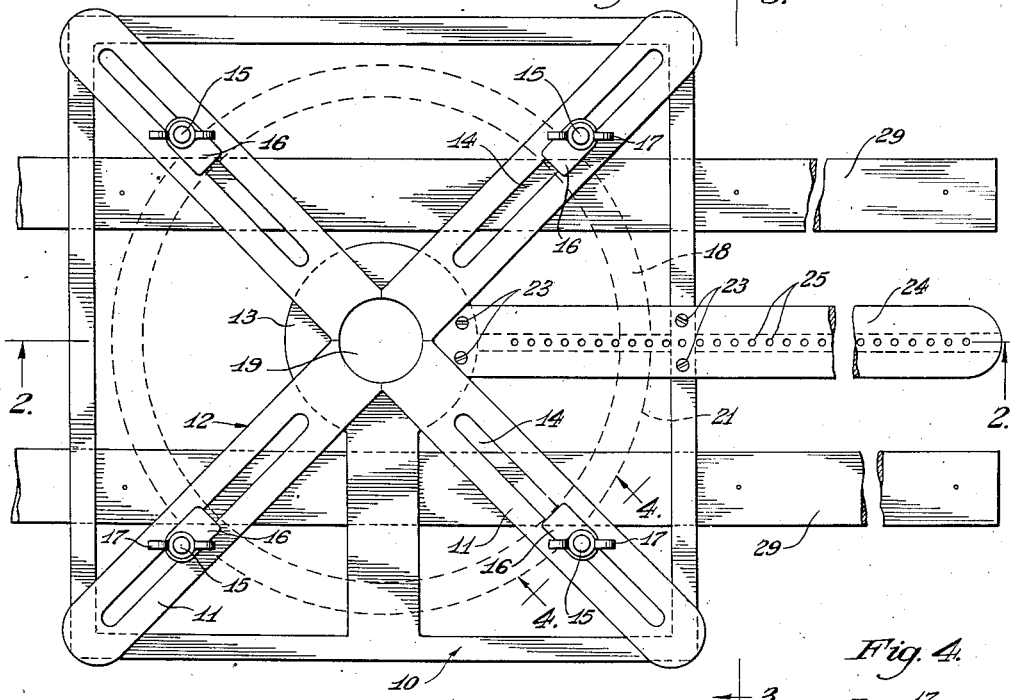
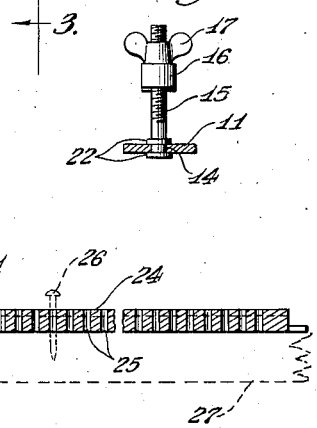
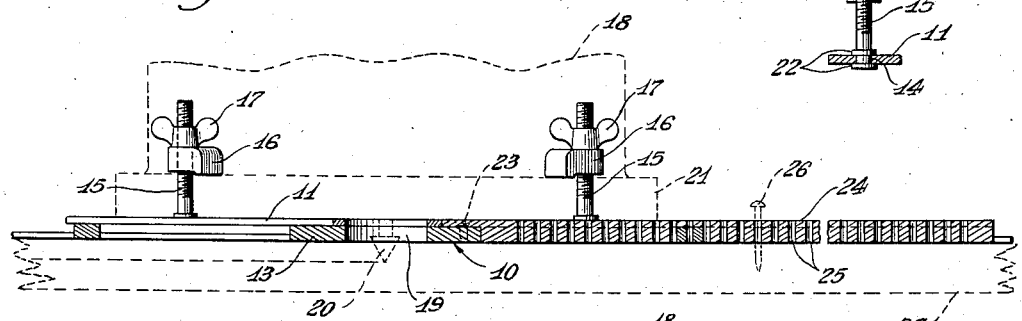
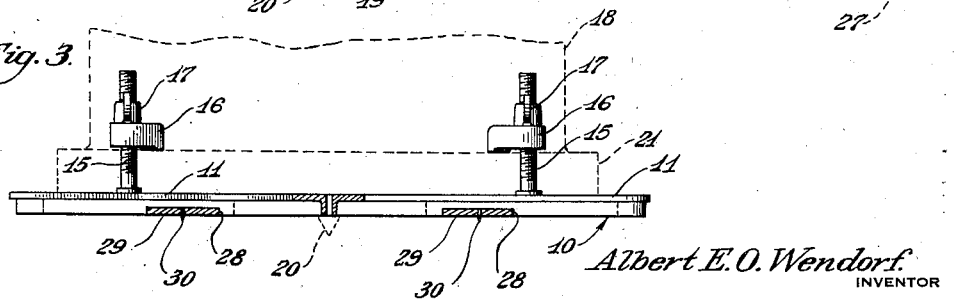
Albert E. O. Wendorf,
INVENTOR
BY Victor J. Evans & Co.
HIS ATTORNEYS Patented Apr. 18, 1933

1,904,109

UNITED STATES PATENT OFFICE

ALBERT E. O. WENDORF, OF WAUWATOSA, WISCONSIN

ROUTER GAUGE AND GUIDE

Application filed April 6, 1932. Serial No. 603,643.

This invention relates to certain novel improvements in a router gauge and guide, and has for its principal object the provision of an improved construction of this character which will be highly efficient in use and economical in manufacture.

Objects of this invention are: to provide a new and efficient, relatively inexpensive gauge and guide for routers or like cutting tools; to construct said gauge so that it is capable of a wide variety of adjustments when employing the router to cut circles and arcs of circles; and to provide new and efficient means for guiding the router when working the router cutter in a straight line.

Other objects will appear hereinafter.

The invention consists in the novel combination and arrangement of parts to be hereinafter described and claimed.

The invention will best understood by reference to the accompanying drawing showing the preferred form of construction, and in which:

Fig. 1 is a top plan view of my improved gauge;

Fig. 2 is a sectional view on line 2—2 in Fig. 1;

Fig. 3 is a view on line 3—3 in Fig. 1, partly in elevation and partly in section; and Fig. 4 is a sectional detail view on line 4—4 in Fig. 1.

In the drawing, which illustrates a preferred and practical embodiment of the invention, 10 indicates an open frame on which is loosely mounted a member 12 which includes a center portion or ring 13 and a group of arms 11 that extend radially from said ring 13. Each of these arms 11 is provided with an axially extending slot 14. Slidable in each of these slots 14 is a bolt 15. On each of the bolts 15 a router-clamping member 16 is slidably mounted and a wing nut 17 is provided on each of the bolts 15 to tighten the clamping members 16 against a flange 21 of a power-driven router such as is schematically indicated at 18; and thereby to secure the router 18 to the frame 10. Flanges 22 are provided on each of the bolts 15 to retain the bolts 15 in the slots 14.

A circular opening 19 is provided in the center portion 13 of member 12 and the cutter 20 of the router is adapted to work in this opening 19.

Attached to the frame 10 by suitable fastening elements 23 is a radius arm 24 which is provided with a row of spaced openings 25 which are adapted selectively to receive a pivot which may be a nail 26 or the like; said nail 26 or the like being adapted to be driven into the work 27 whereby the frame 10, member 12 and router 18 may be pivoted about the element 26 for the purpose of describing circles or arcs or curves in the work 27 with the router cutter 20; the arm 24 gauging the radius of the arc or circle described by the router cutter 20.

The invention includes an attachment for guiding the router cutter 20 when it is desired to cut a straight line groove or the like in the work 27. For this purpose pairs of aligned parallel grooves 28 as provided in the bottom of frame 10 and receivable in each of these pairs of grooves is a guide bar 29. In each of the guide bars 29 fastening elements 30 are provided for attaching the guide bars 29 to the work such as 27. It is to be understood that the pivot pin 26 is not fastened in the work when working the router cutter 20 in a straight line. In the latter case the frame 10, router 18, and router cutter 20 are guided over the work 27 by sliding the frame 10 on the guide bars 29.

The device 18 may be a cutting tool of any conventional design, such as, for example, the electric routers now commonly used for working in wood. These routers are customarily provided with a flange 21 and by adjusting the bolts 15 in the slots 14 the clamping members 16 may be clamped to the flange 21 on routers of various sizes.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. A device of the class described, comprising a frame, radially extending arms on said frame each provided with a slot, an element slidable in each of said slots, clamping means on each of said elements, and means associated with said frame for guiding the same relative to the work.

2. A device of the class described comprising an open frame, a series of radially extending intersecting arms on said frame each provided with a slot, a member at the intersection of said arms provided with an opening, an element adjustably mounted in each of said slots, clamping means on each of said elements, and means associated with said frame for guiding the same relative to the work.

3. A device of the class described comprising an open frame, a series of radially extending intersecting arms on said frame each provided with a slot, a member at the intersection of said arms provided with an opening, an element adjustably mounted in each of said slots, clamping means on each of said elements, and a radius arm attached to said frame and to said member provided with a row of spaced openings for the selective reception of a pivot pin.

4. A device of the class described comprising an open frame provided with a groove, a series of radially extending intersecting arms on said frame each provided with a slot, a member at the intersection of said arms provided with an opening, an element adjustably mounted in each of said slots, clamping means on each of said elements, a guide bar in said groove, and means for attaching said guide bar in fixed position relative to said frame.

5. A device of the class described, comprising a frame, radially extending arms on said frame, clamping means carried by each of said arms and slidable axially therealong, and means associated with said frame for guiding the same relative to the work.

In testimony whereof I affix my signature.

ALBERT E. O. WENDORF.